USOO5636750A

United States Patent [19]
Heyl

[11] Patent Number: 5,636,750
[45] Date of Patent: Jun. 10, 1997

[54] METHOD AND APPARATUS FOR AUTOMATICALLY LOCATING AN ITEM IN A MOVABLE STORAGE SYSTEM

[75] Inventor: Jon Heyl, North Aurora, Ill.

[73] Assignee: Richards-Wilcox, Inc., Aurora, Ill.

[21] Appl. No.: 462,127

[22] Filed: Jun. 5, 1995

Related U.S. Application Data

[63] Continuation of Ser. No. 62,619, May 10, 1993, abandoned.

[51] Int. Cl.$^6$ .................................................. A47F 3/08
[52] U.S. Cl. ......................... 211/1.57; 211/122; 312/201
[58] Field of Search .................................. 211/1.57, 122; 312/198, 199, 200, 201

[56] References Cited

U.S. PATENT DOCUMENTS

| | | | |
|---|---|---|---|
| 3,178,243 | 4/1965 | Dirmeyer | 312/200 |
| 3,269,788 | 8/1966 | Kneer | 312/200 X |
| 3,535,009 | 10/1970 | Cain | 312/199 |
| 3,957,322 | 5/1976 | Mastronardi et al. | 312/201 X |
| 4,119,376 | 10/1978 | Moyer | 312/198 |
| 4,307,922 | 12/1981 | Rhodes, Jr. | 312/201 X |
| 4,437,711 | 3/1984 | Dahnert | 312/201 |
| 4,733,923 | 3/1988 | Dahnert | 312/201 |
| 4,743,078 | 5/1988 | Dahnert | 312/201 |
| 4,759,592 | 7/1988 | Dahnert | 312/201 |
| 4,772,176 | 9/1988 | Montgomery | 211/1.57 X |
| 4,783,618 | 11/1988 | Artrip | 312/201 |
| 4,934,767 | 6/1990 | Hoyt, III et al. | 211/1.57 X |
| 5,044,703 | 9/1991 | Dahnert | 312/201 |
| 5,207,335 | 5/1993 | Voelz | 312/198 X |
| 5,330,062 | 7/1994 | Murphree | 312/198 |

*Primary Examiner*—Korie Chan
*Attorney, Agent, or Firm*—Pearne, Gordon, McCoy & Granger

[57] ABSTRACT

Items are stored in movable containers having multiple storage locations. The containers can be rows of storage units having shelves and bays in a mobile aisle storage system. The identity and location of each item is stored in a computer. To retrieve a selected item, its identity is entered into the computer. The computer automatically moves the containers to open the aisle where the selected item is stored to permit access to the item. The location of the item is indicated on a visible display which shows, for example, the shelf and bay number where the item is stored.

14 Claims, 2 Drawing Sheets

METHOD AND APPARATUS FOR AUTOMATICALLY LOCATING AN ITEM IN A MOVABLE STORAGE SYSTEM This is a continuation of application Ser. No. 08/062,619, filed May 10, 1993 now abandoned.

BACKGROUND OF THE INVENTION

1. Field of the Invention

This invention relates generally to movable storage systems, and specifically, to an automatic item locator for such systems.

2. Description of the Related Art

Mobile aisle storage systems include a plurality of storage units. Each storage unit has a plurality of shelves which may be divided into compartments. The units are aligned in a parallel arrangement having opposing faces forming bays on which the shelves are located. Typically, the storage units are mounted on wheel carriages which ride on tracks or rails recessed in the floor. Each storage unit has a motor or driven drive train propelling it bidirectionally on the tracks. Usually, outermost units in the series are stationary and other units are controlled to move toward and away from each other to form aisles between units. The units are spaced to incorporate a single aisle or multiple aisles to maximize the use of available space. The units can also incorporate a secondary aisle and increase the accessibility of the system.

In some systems, movement of the storage units is controlled by switches located at one end of each unit, as shown, for example, in U.S. Pats. Nos. 4,437,711, 4,733,923, 4,743,078, and 4,759,592 all to Dahnert, U.S. Pat. No. 4,119,376 to Moyer, and U.S. Pat. No. 4,783,618 to Artrip. The controls can be integrated so that pressing one button near a selected aisle to be accessed will move all of the storage units necessary to open the selected aisle.

The bays, shelves, and compartments are generally labelled to uniquely identify different locations. In addition, the items stored in the units, such as paper files, may be labelled for identification. Typically, an operator who desires to retrieve a file will determine its location from an index or other record. The operator will then go to the aisle where the file is stored and, if the aisle is closed, press the button which moves the units to open the aisle. Safety devices are provided to ensure that an aisle occupied by a person or object is not closed. The operator finds the file location and removes the file.

It would be desirable to have an automated system which eliminates the need to determine the location of a selected item prior to entering the storage area. The system should automatically permit access to the storage location of the selected item and should provide a visible indication near the storage location. The system should also be able to track the status of items which are stored in or removed from the storage units.

SUMMARY OF THE INVENTION

The present invention provides a storage apparatus which includes a plurality of movable storage containers each having a plurality of identifiable storage locations and means to move the containers. An interface is provided to receive information for a selected item. Display means are connected to the interface to receive the information for the selected item and display the location of the selected item adjacent a container in which it is stored. A controller operates the container moving means in response to a signal from the interface means indicating the location of the selected item to be retrieved so as to move the containers to allow access to the container in which the selected item is stored.

A computer including the memory and interface can be used to control the movement of the containers. Preferably, the containers are storage units in a mobile aisle storage system. The storage units are guided by a track or rail and are moved by motors.

Displays can be located at an end of each storage unit to display, for example, a shelf and bay number where a selected item is located. Displays can also be located on the shelves to be illuminated, adjacent the location of the selected item on the shelf.

A method of retrieving an item stored in a designated location of a mobile aisle storage apparatus is also disclosed. Location information for stored items is stored in a memory device. An operator inputs the identity of the item in a storage unit controller, and the controller retrieves the location information of the item from the memory and opens the aisle in which the item is stored. The controller indicates the location on a visible display, the operator reads the location indicated and retrieves the item from the location.

When an item is retrieved, the computer can retain the status of the item in memory, that is, the item can be identified as having been removed from storage. To return the item to storage, the item's identity is input to the computer, the storage units are moved to provide access to the storage location, and the location is indicated on the display. The item is returned to its storage location, and the computer stores the status of the item as being in its storage location.

DESCRIPTION OF THE PREFERRED EMBODIMENT

Figure 1:
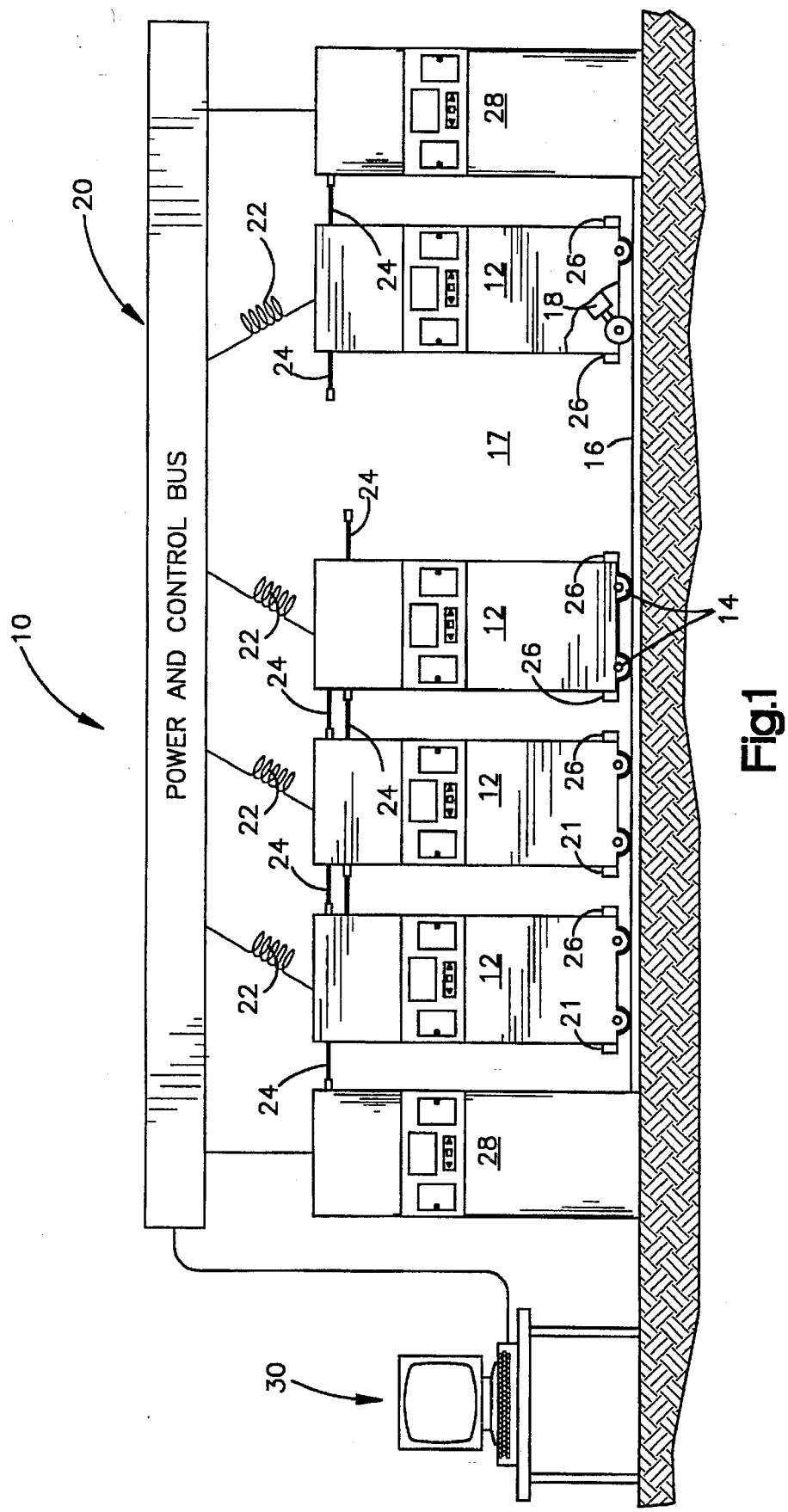
FIG. 1 shows a side elevational view of a mobile aisle system according to the invention.

Referring to FIG. 1, a mobile aisle storage system 10 includes a plurality of spaced, movable storage units 12 adapted to store items and disposed to have opposing faces on which items can be stored. Each of the storage units 12 is supported by a plurality of wheels 14 which ride on recessed rails or tracks 16 to guide the storage units for movement toward and away from each other. The storage units are arranged so that they can be moved on the tracks to form an aisle 17 between two of the storage units while minimizing the spaces between other units. The aisle 17 permits access to the opposing faces of the storage units from the aisle which can be entered from one or both ends.

The wheels 14 are preferably driven by an electric motor 18 in each of the storage units 12. The units are connected to a power and control bus 20 by electrical cables 22. Each of the storage units 12 has electronic or mechanical proximity sensors 24 to detect and indicate when two storage units are immediately adjacent each other. Safety sweeps 26 may be provided along lower edges of the storage units 12 to automatically stop movement of the units when an obstruction is encountered. Stationary end storage units 28 adapted to store items are disposed at opposite ends of the system so that the movable storage units 12 are located between the end units 28. A control station 30 is connected to control the storage system through the power and control bus 20.

Figure 2:
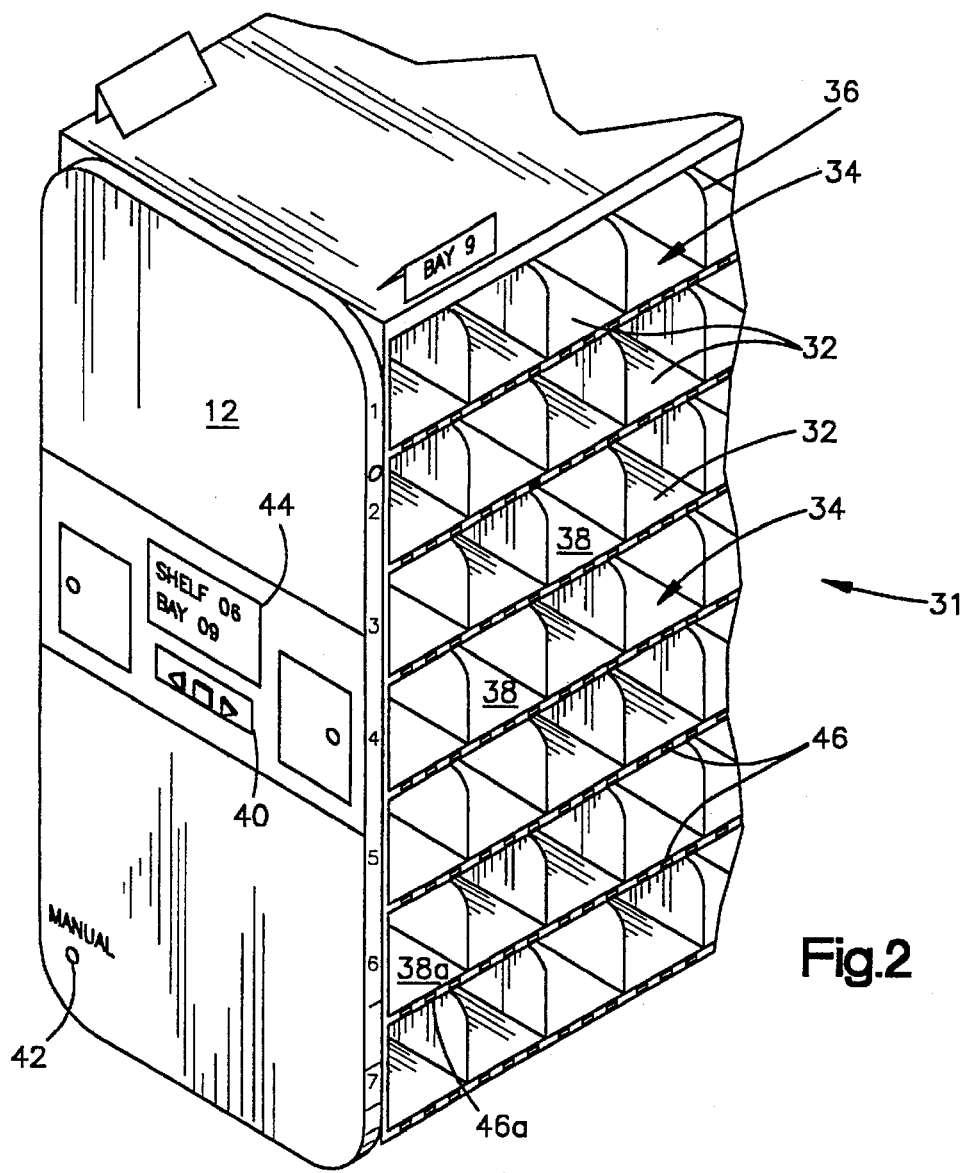
FIG. 2 shows a perspective view of a storage unit of the mobile aisle system according to the invention.

Referring to FIG. 2, the movable storage unit 12 includes a plurality of storage locations 38. A face of each unit 12 forms a bay 31 having shelves 32 which can be subdivided into compartments 34 by partitions 36. Each bay, shelf, and compartment has a unique designation. For example, shelves may be numbered from top to bottom, and vertical columns of compartments may be numbered from one end of the storage unit 12 to another. In the storage unit 12 shown in FIG. 2, the designation "Bay 9, Shelf 6, Compartment 1" designates the storage location shown by reference numeral 38a. Similar shelves and partitions can be provided on the stationary end storage units 28 as well.

Control of the storage system is generally accomplished at the control station 30, however, local control of the storage units 12 may be provided by a local control panel 40 located on an end of each unit. The local control panel 40 is connected to control the motors 18 in the storage units 12. A means 42 to manually move the unit 12 with a hand crank, for example, can also be provided.

An end of the storage unit is provided with a visible display 44. The display 44 can be any one of a number of known types which use an array of lightable elements or dots to form symbols such as alphanumeric characters. As is known in the art, the lightable elements can be directly lightable, such as light emitting diodes or incandescent lamps which are energized to generate light, or indirectly lightable such as liquid crystal displays, reflective disks or magnetic dots which reflect or obstruct an independent light source. The lightable elements are preferably light emitting diodes.

A plurality of local displays 46 are located on the shelves 32 adjacent the storage locations 38 on the movable and stationary storage units 12 and 28. The local displays 46 are similar to the display 44 at the end of the unit 12, except that the local displays need not necessarily display characters.

Figure 3:
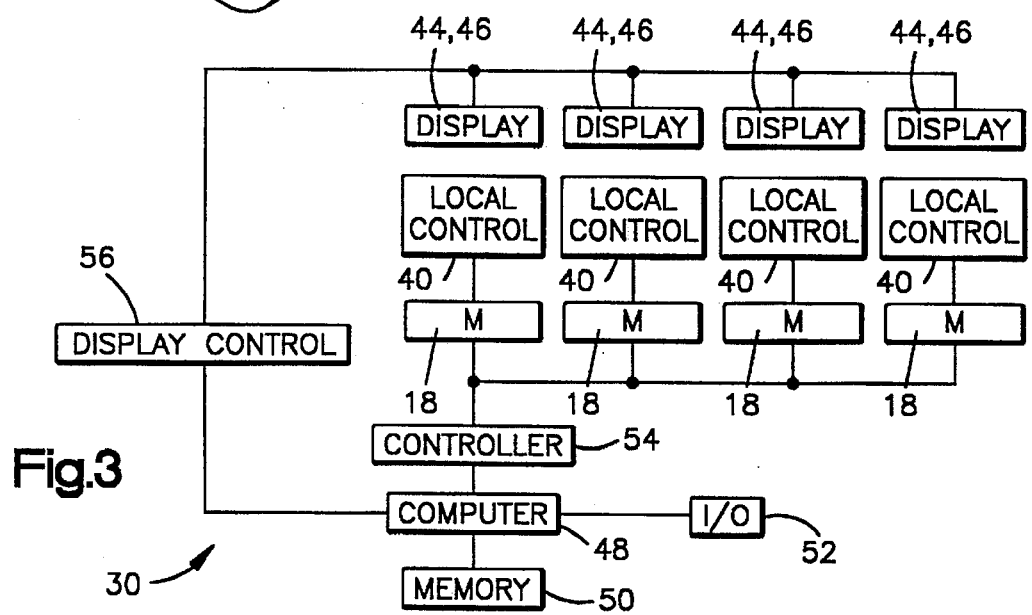
FIG. 3 shows a block diagram of a control system for the mobile aisle system according to the invention.

Referring to FIG. 3, the control station 30 preferably includes an interface, such as a microprocessor or computer 48, connected to a memory 50 and an input/output device 52, such as a keyboard. The computer 48 is connected to a motor controller 54 to control movement of the storage units 12 by the motors 18. The local control panels 40 and motor controller 54 are used to perform operations such as controlling each of the motors 18 so as to move the storage units to open an aisle to the left or right of a unit or to stop movement of the units.

A display controller 56 is connected to control the displays 44 and 46. The display controller 56, preferably microprocessor based, selectively lights certain elements of the display 44 to form numbers, letters and other symbols including graphic depictions in response to input from the computer 48. The symbols can be displayed in different sizes, locations and colors. The local displays 46 are connected so that a selected one of the local displays can be illuminated by the controller 56 to draw a person's attention to a particular shelf and bay adjacent the display 46.

In operation, an operator who desires to store an item uses the input/output 52 to input commands to the computer 48 at the control station 30. The commands may identify the item to be stored, its desired storage location, or both. In response to the commands, the storage units 12 are moved to open a selected aisle 17 which permits access to a specific storage location 38 in the aisle, for example, shelf 6 in bay 9. The commands identify the item to be stored and its intended location, which information is stored in the memory 50. Items may be identified by a name, number, or other unique description. The motor controller 54 operates the motors 18 necessary to move the storage units 12 to open the selected aisle 17. Each of the motors 18 is controlled separately so that a storage unit can be stopped when its proximity sensor indicates that it is adjacent another storage unit toward which it is moving. The display controller 56 operates the display 44 to show characters which identify the storage location 38a by its designation, shelf 6, bay 9. The display controller 56 can also illuminate one or more local displays 46a to indicate the storage location.

When the storage units are all stopped, the operator proceeds to the open aisle 17 with the item and places the item in the location 38a designated shelf 6, bay 9. The operator can then return to the control station 30 to input a command indicating that the item has been successfully stored. The process may be repeated to store other items.

To retrieve a selected item which has been previously stored according to the process described above, an operator enters commands into the computer 48 which indicate the identity of the item to be retrieved. The computer 48 retrieves the storage location of the selected item from the memory 50 and operates the motor controller to open the aisle, which permits access to the storage location of the selected item. The computer 48 also operates the display controller 56 to show the designation of the storage location on the display 44. The display controller 56 can also illuminate the local display 46 adjacent the storage location. For example, if the item stored at location 38a in the description above is to be retrieved, aisle 17 would be opened, the display 44 would show "Shelf 6, Bay 9, " and the local display 46a would be illuminated.

When the movement of the storage units has stopped, the operator proceeds to the open aisle and reads the display 44. Then the operator moves to the location 38a and may be further aided in finding the location by the local display 46a. The operator retrieves the item from the designated location 38a and returns to the control station to indicate that the item has been successfully retrieved. The computer 48 stores in the memory 50 information indicating the status of the item, that is, that it has been retrieved. The identity of the operator who has retrieved the item and other useful information may also be stored in the memory 50 to assist another operator who is attempting to retrieve the item, for example.

In this way, a convenient and efficient apparatus and method for storing and retrieving items in a mobile aisle storage system is provided. The present disclosure describes several embodiments of the invention, however, the invention is not limited to these embodiments. Other variations are contemplated to be within the spirit and scope of the invention and appended claims.

What is claimed is:

1. A storage apparatus, comprising:
   a plurality of movable storage units arranged with adjacent units having opposed open faces, each unit having a plurality of identifiable storage locations at respective opposed faces of the units, said movable units being selectively movable to create a space between a pair of units, said space defining an aisle providing access to the storage locations at the opposed open faces of the spaced units;
   means to move the units to create the aisle;
   an interface to receive information for a selected item;
   display means connected to the interface to receive the information for the selected item and display the identity of the location of the selected item adjacent a unit in which the item is stored, wherein said display means comprises a display disposed on each of said plurality of movable storage units, and a plurality of local displays disposed on each of said plurality of movable storage units; and a controller which operates the unit moving means in response to a signal from the interface means indicating the location of the selected item to be retrieved to move the units to create the space between the pair of units to allow access to the unit in which the selected item is stored.

2. A storage apparatus according to claim 1, further comprising a memory to store information concerning items stored in the units, said interface being connected to transfer information to and from the memory.

3. A storage apparatus according to claim 1, wherein the opposed faces are disposed parallel to each other.

4. A storage apparatus according to claim 3, further comprising means to guide the units for relative movement normal to the faces of the units.

5. A storage apparatus according to claim 1, wherein the display means are located at an end of each storage unit.

6. A storage apparatus according to claim 1, wherein the display means comprise a plurality of alphanumeric displays.

7. A storage apparatus according to claim 1, wherein the display means comprise a plurality of light emitting diode displays.

8. A storage apparatus according to claim 1, wherein the display means indicates the identity of a shelf on which the selected item is stored.

9. A storage apparatus according to claim 1, wherein elements of the display means are located adjacent locations of shelves where items are stored.

10. A storage apparatus according to claim 9, wherein a selected display element adjacent the selected item indicates the location of the selected item.

11. A storage apparatus according to claim 5, further comprising second display means located adjacent storage locations where items are stored to indicate the location of the selected item adjacent the item.

12. A storage apparatus according to claim 2, wherein the memory is adapted to retain the identity of the selected item.

13. An improved mobile aisle storage system, comprising:

a plurality of movable storage containers having faces at which items can be stored in identifiable storage locations, the containers being arranged so that faces in adjacent containers are generally parallel and opposing; and means to move the containers to form one of a plurality of aisles between opposing faces of a selected pair of adjacent containers to permit access to a selected storage location through the aisle;

wherein the improvement comprises display means movable with the containers to identify the selected storage location adjacent each aisle that permits access to the storage location, said display means including a display disposed on each of said plurality of movable storage containers serving to identify the container having the selected storage location, and a plurality of local displays disposed on each of said plurality of movable storage containers serving to identify the selected storage location.

14. A mobile aisle storage system according to claim 13, further comprising a controller which operates the container moving means in response to an identification of an item to be stored or retrieved.

* * * * *